Aug. 20, 1968  D. J. SULLIVAN ET AL  3,397,856
STRUCTURAL BEARING PAD
Filed Nov. 14, 1966
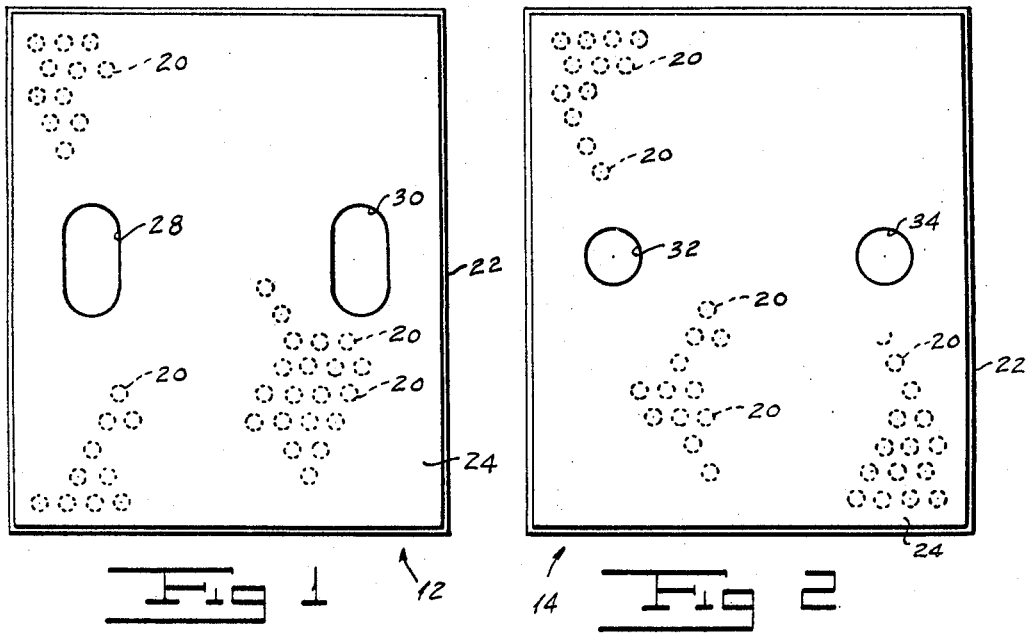
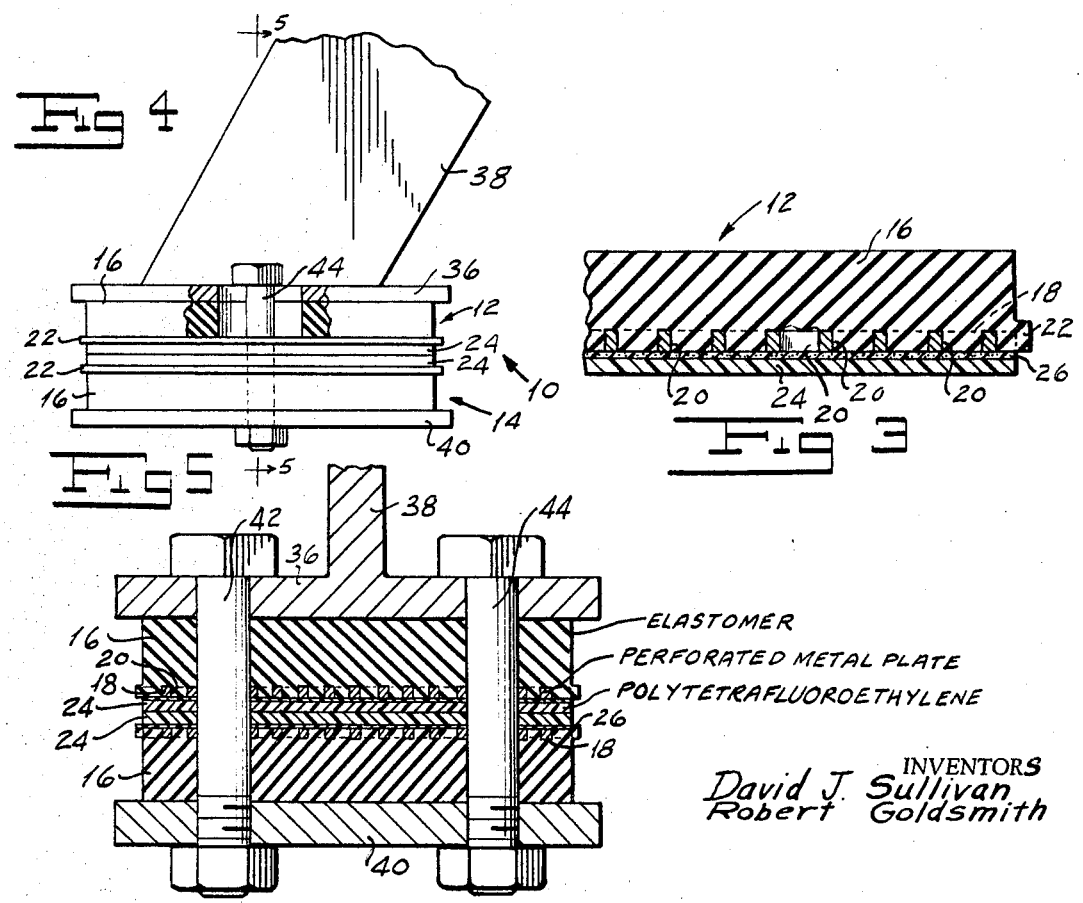
INVENTORS
David J. Sullivan
Robert Goldsmith

United States Patent Office 3,397,856
Patented Aug. 20, 1968

3,397,856
STRUCTURAL BEARING PAD
David J. Sullivan, Bridgeport, Conn., and Robert Goldsmith, South Orange, N.J., assignors to General Plastics Corporation, Bloomfield, N.J., a corporation of New Jersey
Filed Nov. 14, 1966, Ser. No. 593,835
9 Claims. (Cl. 248—22)

ABSTRACT OF THE DISCLOSURE

In general our invention contemplates the provision of a composite bearing pad for supporting a structure in which each of an upper pad and a lower pad comprises a relatively thick layer of an elastomer having a perforated metallic sheet embedded therein at one surface thereof and having a polytetrafluoroethylene sheet bonded to the one surface. The upper and lower pads are held in superposed relationship between a plate on the structure and a ground plate by bolts with the polytetrafluoroethylene sheets in contact. We so form the bolt-holes in one of the pads as to permit limited relative movement between the pads in response to thermal expansion and contraction of the structure.

Background of the invention

Structures, such as large buildings and bridges and the like, carried by a stationary support, the earth, usually are provided with a bearing pad which is intended to absorb both the static load of the structure and the dynamic load resulting from vibrations of the structure. Not only must the support pad absorb static and dynamic loads, but also it must permit some relative movement between a structural member and the earth resulting from expansion and contraction of the structural member occasioned by changes in temperature.

In the prior art the support pad usually is a block of an elastomer sandwiched between a steel plate on the structure and a plate carried by the earth. It is intended that the "dead" or static load be absorbed by compression of the elastomer. Dynamic loads are to be absorbed by vibration in the elastomeric material itself. In response to relative movement between the plates when the temperature changes, shear forces distort the pad.

These pads of the prior art are quite large. Under their combined action of static and dynamic loads and the distortion occasioned by temperature change, the pads ultimately fail, usually by tearing of the elastomer in the central region of the pad or by slippage of the pad relative to one of the plates.

We have invented a structure bearing pad which is an improvement over bearing pads of the prior art. Our pad is so constructed as to reduce the effect of shear forces on the material of which the pad is made. For a given structure our pad is smaller than are pads of the prior art. It has a longer life than do pads of the prior art. It effectively resists both the static load and the dynamic load of a structure.

Summary of the invention

One object of our invention is to provide a structure bearing pad which is an improvement over bearing pads of the prior art.

Another object of our invention is to provide a bearing pad for structures which reduces the effect of shear forces on the material of the pad.

A further object of our invention is to provide a bearing pad for structures which pad is smaller than a pad of the prior art for accomplishing the same result.

Still another object of our invention is to provide a bearing pad for structures which has a longer life than do pads of the prior art.

A still further object of our invention is to provide a bearing pad for structures which effectively resists both dynamic and static loads.

Other and further objects of our invention will appear from the following description.

In general our invention contemplates the provision of a structural bearing pad including a relatively thick layer of an elastomer having a perforated metal plate embedded therein and a thin sheet of polytetrafluoroethylene bonded to the elastomer slab adjacent the metal plate.

Brief description of the drawings

In the accompanying drawings which form part of the instant specification and which are to be read in conjunction therewith and in which like reference numerals are used to indicate like parts in the various views:

FIGURE 1 is a plan iew of the upper pad of our bearing pad for a structure.

FIGURE 2 is a plan iew of the bottom pad of our bearing pad for structures.

FIGURE 3 is a fragmentary sectional view of our bearing pad for structures.

FIGURE 4 is a fragmentary view with parts broken away showing our bearing pad in use.

FIGURE 5 is a fragmentary sectional view of our assembled bearing pad taken along the line 5—5 of FIGURE 4 and drawn on an enlarged scale.

Description of the preferred embodiment

Referring now to the drawings, our bearing pad indicated generally by the reference character 10 is made up of an upper bearing pad indicated generally by the reference character 12 and a lower bearing pad indicated generally by the reference character 14.

Since the structure of both the upper bearing pad 12 and the lower bearing pad 14 is the same with the exception of bolt-holes to be described hereinafter, we will describe in detail only one of the pads such, for example, as the pad 12. Pad 12 includes a relatively thick layer 16 of a suitable elastomeric material. We have found that synthetic rubber such as neoprene having a Shore durometer or sclerometer test figure of about 70 is a particularly advantageous material for use in our pad.

We embed a relatively thin plate 18 of a suitable metal which, preferably, is steel, in the layer 16 at the undersurfac thereof as viewed in FIGURE 3. We provide the sheet or plate 18 with a plurality of perforations 20 which are filled with rubber when the plate is assembled in the neoprene layer 16. In the course of that operation we provide layer 16 with a lip 22 extending around the periphery of the pad to cover the edges of plate 18 to protect it against corrosion.

Having assembled the plate 18 in the layer 16 we apply a film or sheet 24 of a fluorocarbon polymer resin, such as polytetrafluoroethylene or polytrifluorochloroethylene, to the surface of the layer 16 in which the plate 18 is embedded. The film or sheet is made in any manner known to the art such as described in Landrum et al. Patent 2,951,783. Prior to applying sheet 18, we etch the surface thereof in any known manner such as, for example, that described in Doban Patent 2,871,144, and then coat the etched surface with a suitable adhesive layer 26 such, for example, as a heat-activatable epoxy resin. We select such an adhesive as will provide about 30 pounds per square inch shear resistance and which will function at temperatures up to about 500° F. After having formed the upper pad 12 in the manner described, we form a second pad in substantially the same manner, which pad is the lower pad 14 of our structure.

When the two pads have been made, we form respective generally elliptical bolt-holes 28 and 30 in the upper pad and circular bolt-holes 32 and 34 in the lower pad. To install our bearing pad we place the upper pad 12 and the lower pad 14 in superposed relationship between a plate 36 carried by a structural member 38 of the structure to be supported and a ground plate 40. When the plates have properly been positioned with the holes 32 and 34 registering respectively with the holes 28 and 30, we bolt plate 36 to plate 40 with the pads 12 and 14 therebetween. The two pads 12 and 14 are so arranged that the surfaces of the respective polytetrafluoroethylene sheets 24 of the two pads are in contact.

In operation of our pad the neoprene layers 16 serve to absorb the static load by compression thereof. The resiliency of the neoprene serves to absorb dynamic load. The two contacting polytetrafluoroethylene sheets 24 provide a coefficient of friction therebetween of only about 0.05%. Slippage between the two polytetrafluoroethylene sheets not only allows for thermal expansion but also reduces the effect of dead load surges. Introduction of the perforated steel plates reduces the size of the pad for the same degree of service as would be provided by a larger pad of the prior art. The load carrying ability of the steel plates also minimizes the danger of overdeflection of the neoprene 16. As has been explained hereinabove, the perforations 20 in the steel plates 18 provide intimate union between the neoprene and the steel. Flow of neoprene through the perforations affords unusually high shear resistance. The elliptical bolt-holes 28 and 30 permit limited slippage between the assembly of pad 12 and plate 36 and the assembly of pad 14 and plate 40.

It will be seen that we have accomplished the objects of our invention. We have provided a structure bearing pad which is an improvement over bearing pads of the prior art. Our pad is smaller than are pads of the prior art for accomplishing the same result. It has a longer life than do pads of the prior art. It is adapted to carry higher loads for a given size and to permit greater thermal expansion than is possible in pads of the prior art.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A composite pad for mounting a structure on a support including in combination, a first pad comprising a slab of an elastomer having a Shore durometer figure of between about 50 and about 70, a thin perforated metal plate embedded in said slab at one surface thereof, a sheet of fluorocarbon resin, and means bonding said sheet to said one surface, a second pad comprising a slab of an elastomer having a Shore durometer figure of between about 50 and about 70, a thin perforated metal plate embedded in said slab at our surface thereof, a sheet of fluorocarbon resin, and means bonding said sheet to said surface, each of said first and second pads having bolt-holes therethrough, and means including a bolt extending through said bolt-holes for assembling said pads between said structure and said support, the bolt-hole in said first pad being enlarged to permit limited relative movement between said pads.

2. In a support pad for a structure, a relatively thick layer of an elastomer, a metallic plate embedded in said elastomer, a relatively thin layer of a synthetic resin having an inherently slippery surface and means for holding said layers in face to face assembled relationship.

3. In a support pad as in claim 2 in which said resin is polytetrafluoroethylene.

4. In a supported pad as in claim 2 in which said plate is perforated.

5. A composite body for mounting a structure on a support including in combination, a first pad comprising a relatively thick slab of an elastomer, a thin metal plate embedded in said slab, a sheet of a slippery synthetic resin and an adhesive bonding said sheet to said slab, a second pad comprising a second relatively thick slab of an elastomer, a second thin metal plate embedded in said second slab, a second sheet of a slippery synthetic resin, and an adhesive bonding said second sheet to said second slab and means for assembling said first and second pads between said structure and said support with the slippery sheet of the respective pads in contact with each other.

6. A composite pad as in claim 5 in which said thin metal plates are closely adjacent the respective slippery sheets.

7. A composite pad as in claim 5 in which said metal plates are perforated.

8. A composite pad as in claim 5 in which said synthetic resin is polytetrafluoroethylene.

9. A composite pad for mounting a structure on a support including in combination, a first pad comprising a relatively thick slab of an elastomer, a sheet of a slippery synthetic resin and an adhesive bonding said sheet to said slab, a second pad comprising a relatively thick slab of an elastomer, a sheet of a slippery synthetic resin and an adhesive bonding said sheet to said slab, said pads having respective bolt-holes therethrough and means comprising a bolt extending through said bolt-holes for assembling said first and second pads between said structure and said support with the slippery sheets of the respective pads in contact with each other, the hole of one of said pads being enlarged to permit relative movement of one of said pads with respect to the other.

References Cited

UNITED STATES PATENTS

| | | | |
|---|---|---|---|
| 3,099,103 | 7/1963 | Wright | 248—188.8 |
| 3,105,252 | 10/1963 | Milk | 14—16 |
| 3,243,236 | 3/1966 | Graham | 308—3 |
| 3,315,923 | 4/1967 | Young | 248—24 |
| 3,301,609 | 1/1967 | Palfreyman | 14—16 |
| 3,326,508 | 6/1967 | Born | 248—346.1 |

JOHN PETO, *Primary Examiner.*